UNITED STATES PATENT OFFICE.

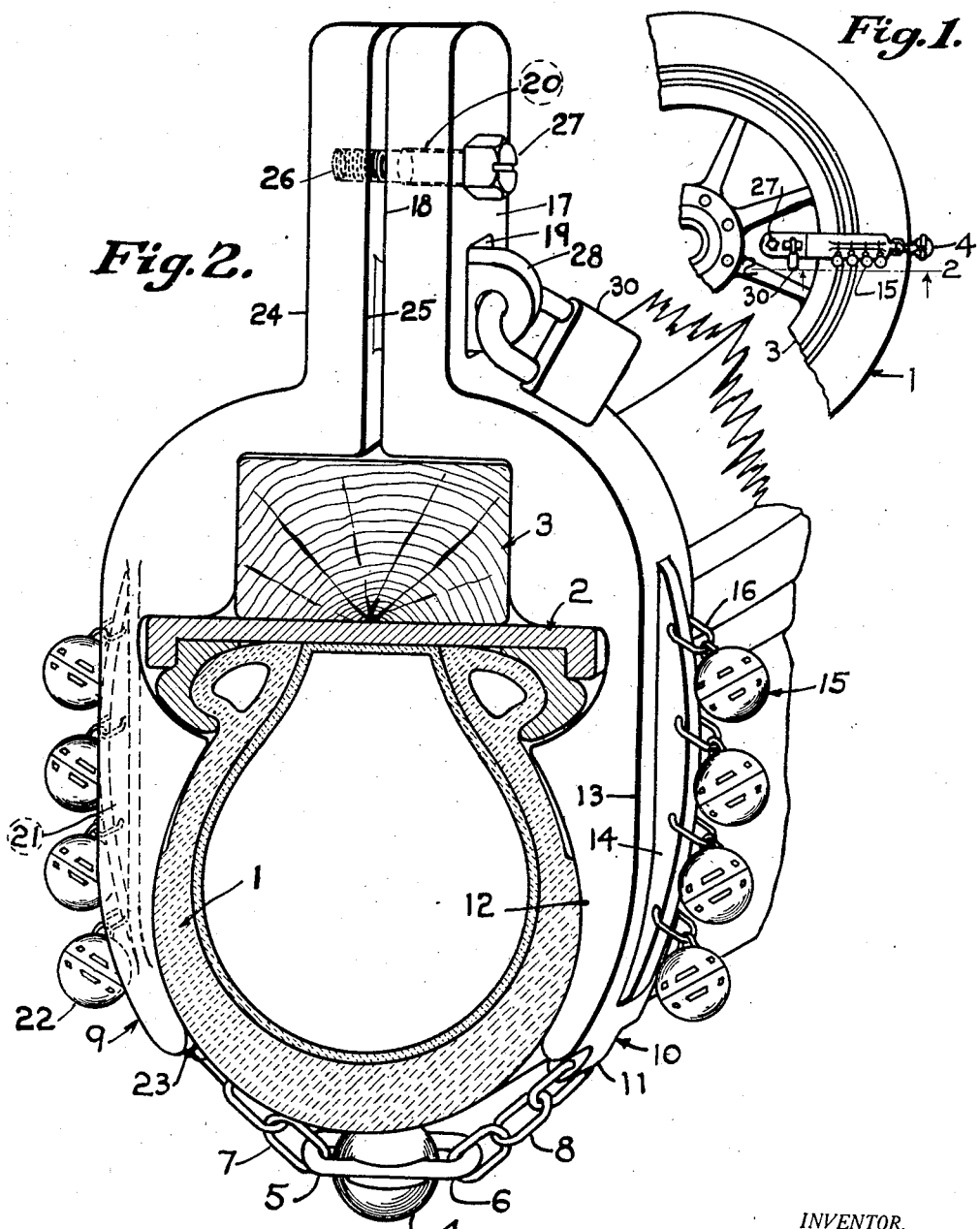

WILLIAM H. DAMON, OF LOS ANGELES, CALIFORNIA.

THEFT-ALARM FOR MOTOR-VEHICLES.

1,332,613.   Specification of Letters Patent.   Patented Mar. 2, 1920.

Application filed January 14, 1919. Serial No. 271,169.

*To all whom it may concern:*

Be it known that I, WILLIAM H. DAMON, a citizen of the United States, residing at Los Angeles, in the county of Los Angeles and State of California, have invented new and useful Improvements in Theft-Alarms for Motor-Vehicles, of which the following is a specification.

My object is to make a theft alarm for motor vehicles, and my invention consists of the novel features herein shown, described and claimed.

Figure 1 is a fragmentary elevation of a wheel provided with a theft alarm in accordance with the principles of my invention.

Fig. 2 is an enlarged cross-sectional perspective detail on the line 2—2 of Fig. 1 and looking upwardly.

Referring to the drawing in detail, the pneumatic tire 1, the rim 2 and the felly 3 may be any construction usually found in a wheel. The ball 4 has ears 5 and 6 extending in opposite directions, chain links 7 and 8 extend from the ears 5 and 6 and the clamping members 9 and 10 are connected to the chain links 7 and 8. The ears 5 and 6 may be formed by placing a chain link in the mold and casting the ball in place or in any other suitable way and the number of chain links 7 and 8 is immaterial and may be varied from one to several. The clamping member 10 is preferably a casting or forging and has an ear 11 into which one of the chain links 8 extends. A solid body 12 extends upwardly from the ear 11 and fits the side of the tire 1 and fits around the rim 2 and against the side of the felly 3 and has a rounded outer face 13. A rib 14 extends outwardly from the face 13 and a series of sleigh bells 15 is attached to the rib 14 by chain links 16. An arm 17 extends upwardly from the upper end of the body 12 and from the upper face of the felly 3, said arm 17 having a straight flat inner face 18 and a transverse opening 19 and a bolt hole 20.

The clamping member 9 is substantially a mate to the clamping member 10 and has a body 21 carrying a series of sleigh bells 22 and an ear 23 connected to the chain link 7. The arm 24 extends upwardly from the upper end of the body 21 and from the upper face of the felly 3 and has an inner face 25 in opposition to the face 18 and a screw thread bolt hole 26 in line with the bolt hole 20. The body 21 fits the outer side of the tire 1 and fits the rim 2 and the felly 3 so that the faces 18 and 20 will come close together. The cap screw 27 is inserted through the bolt hole 20 and screwed into the hole 26 to draw the arms 17 and 24 together. A locking tongue 28 is formed integral with the arm 24 and extends through the opening 19 and has a perforation 29 to receive the padlock 30.

When the theft alarm thus constructed is applied to a wheel, the clamping members fit firmly upon the wheel and tire with the ball 4 against the tread of the tire and obviously the device cannot be removed from the wheel without breaking several of the parts or removing the padlock 30 and when an automobile or the like is thus equipped and a thief starts to move the vehicle, the ball 4 will strike upon the ground and cause the wheel to jump up and down and the bells 15 and 22 will jingle and give notice that the vehicle is being stolen. In order to remove the device from the wheel it is only necessary to apply the key unlocking the padlock 30 and unscrewing the bolt 27.

Various changes may be made without departing from the spirit of my invention, as claimed.

I claim—

1. A theft alarm for vehicles comprising clamping members adapted to engage the sides of a tire, a rim and a felly; a flexible member connecting the lower ends of the clamping members together; arms extending upwardly from the clamping members and adapted to be inside of the felly; a tongue extending from one arm through an opening in the other arm; a padlock connected to the tongue and audible signal means operative when the tire is rotated.

2. A theft alarm for vehicles comprising clamping members adapted to fit the sides of a tire, a rim and a felly; a chain connecting the lower ends of the clamping members together; a ball at the center of the chain; the clamping members being adapted to meet inside of the felly; arms extending from the meeting ends of the clamping members; a tongue extending from one arm through an opening in the other arm; a padlock connected to the tongue and audible signal means operative when the tire is rotated.

3. A theft alarm for vehicles comprising clamping members adapted to fit the sides of a tire, a rim and a felly meeting inside of the felly; means for flexibly connecting the outer ends of the clamping members together; arms extending from the meeting ends of the clamping members inside of the felly; a tongue extending from one arm through an opening in the other arm, there being a perforation through the tongue; a padlock applied with its bar through the opening and audible signal means operative when the tire is rotated.

4. A theft alarm for vehicles comprising clamping members adapted to fit the sides of a tire, a rim and a felly meeting inside of the felly; means for connecting the outer ends of the clamping members flexibly together; arms extending from the inner ends of the clamping members inside of the felly, one arm having a bolt hole and the other arm having a screw threaded hole in line with the bolt hole; a bolt removably mounted in the holes for drawing the arms together; a tongue extending from one arm through an opening in the other arm and having a perforation; a padlock applied with its locking bar in the perforation and audible signal means operative when the tire is rotated.

5. A theft alarm for vehicles comprising clamping members adapted to engage the sides of a tire and a rim, means for flexibly connecting the outer ends of the clamping members together, means for locking the inner ends of the clamping members together; and audible signal means operative when the tire is rotated.

In testimony whereof I have signed my name to this specification.

WILLIAM H. DAMON.